United States Patent [19]

Rose

[11] Patent Number: 4,770,106
[45] Date of Patent: Sep. 13, 1988

[54] RAIL VEHICLE

[75] Inventor: Adolf Rose, Hagen, Fed. Rep. of Germany

[73] Assignee: Mannesmann AG, Duesseldorf, Fed. Rep. of Germany

[21] Appl. No.: 1,634

[22] Filed: Jan. 8, 1987

[30] Foreign Application Priority Data

Jan. 20, 1986 [DE] Fed. Rep. of Germany ....... 3601837

[51] Int. Cl.⁴ .............................................. B61B 5/02
[52] U.S. Cl. ....................................... 105/148; 104/89

[58] Field of Search ............... 105/165, 167, 168, 154, 105/155, 148; 104/89, 95, 243, 247

[56] References Cited

U.S. PATENT DOCUMENTS 745,855 12/1903 Jackson .............................. 104/247

Primary Examiner—Sherman D. Basinger
Attorney, Agent, or Firm—Ralf H. Siegemund

[57] ABSTRACT

The rail vehicle has four wheels, the two on one side are pivotably mounted on bogies which are themselves pivotably mounted to the frame on the vehicle. The wheels on the other side just pivot on vertical axes.

8 Claims, 2 Drawing Sheets

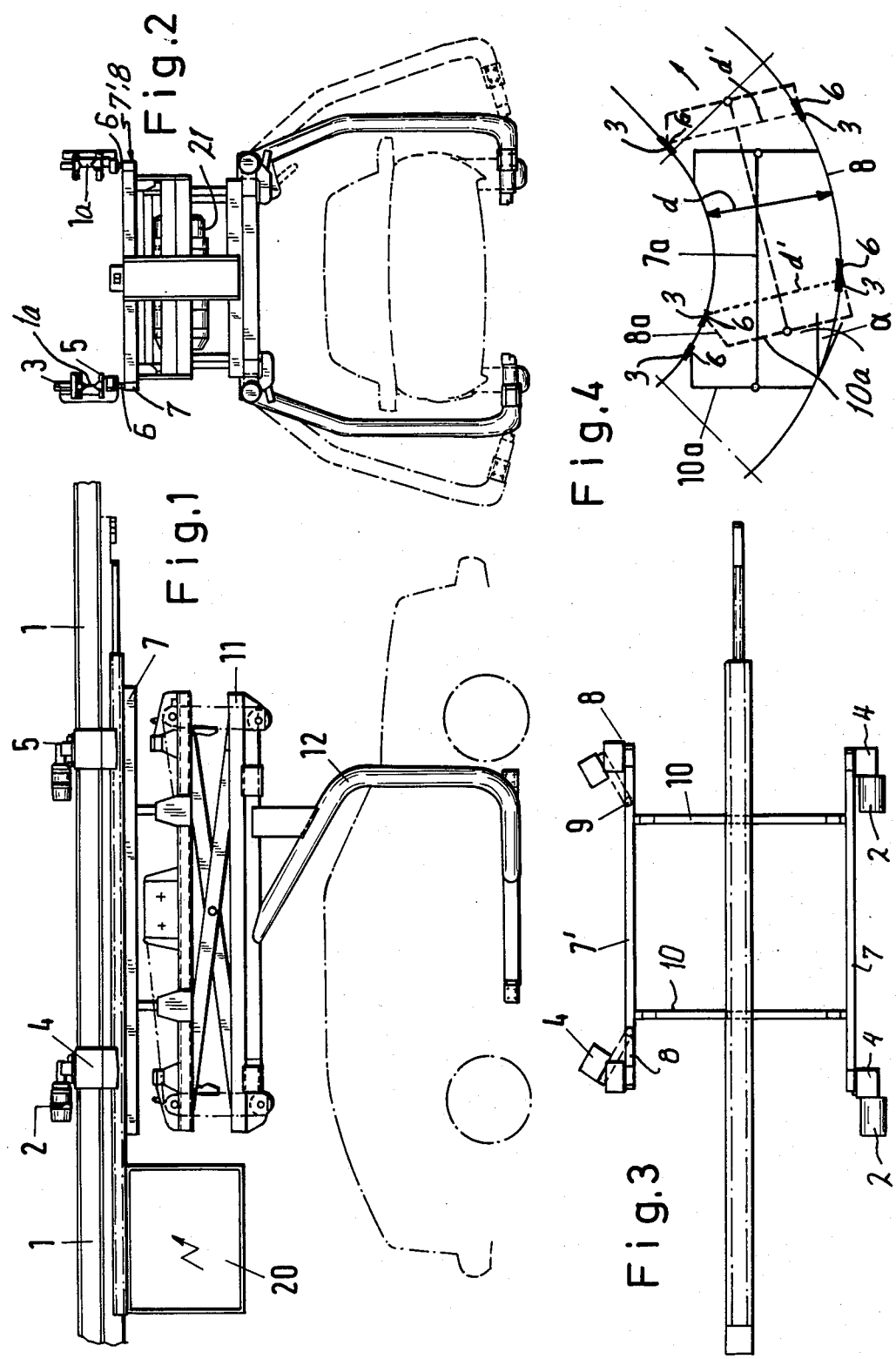

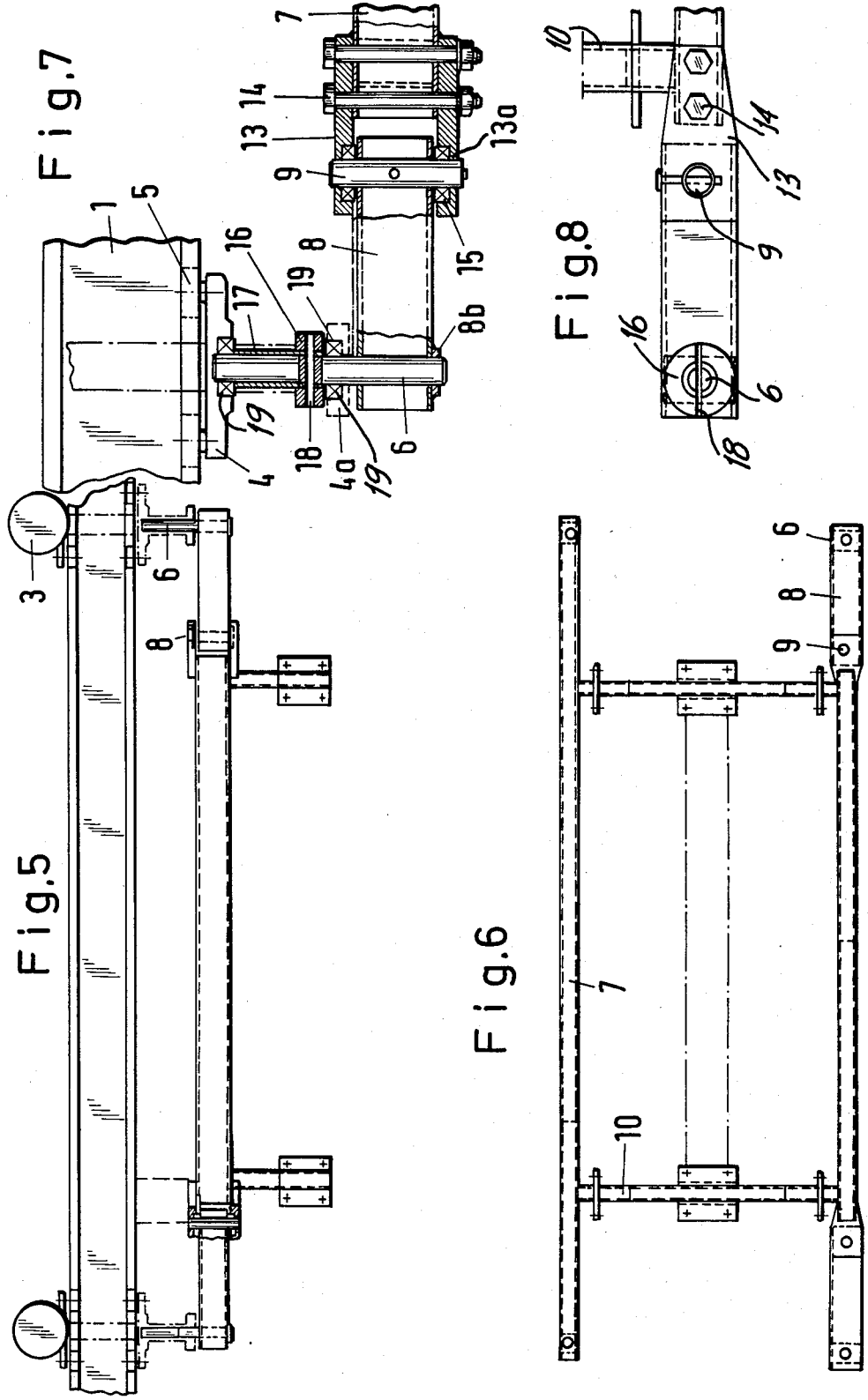

RAIL VEHICLE

BACKGROUND OF THE INVENTION

The present invention relates to a rail vehicle including a frame for wheel mounts being pivotable about the vertical axis; the wheels running on parallel rails.

A rail vehicle of the type to which the invention pertains is for example disclosed in German Pat. No. 32 38 402. Herein any variance in the parallelism of the rails is compensated through transverse motion of the wheel mounts along well defined displacement axes. In the case of curves additional rotational mounts are provided whereby particularly for purposes of compensating irregularities in the rail mounting, the wheel mounts are pivotably suspended from the turning equipment. This way, the aforementioned non-uniformities in rail distance are compensated as well as distortions as they occur in situ or after certain period of time. Pendulum-like, or swing-like or swivel-like longitudinal carriers are arranged to both sides of the wheel bogie and they each carry in front as well as in the back pivotable wheel mounts. Owing to the twin arrangement for the two rails this is rather expensive equipment. Moreover, this kind of vehicle is often used in mining installations which is an environment permitting often the placement of rails only with a limited degree of accuracy, even under most careful working conditions. Such a vehicle has, in fact, altogether ten vertical pivot axes, six longitudinal axes, two transverse slide axes and three transverse swivel axes. Accordingly there are many hinges, swivels, pivot mounts and so forth in the vehicle which render the vehicle quite expensive and owing to a multitude of often superimposed pivot motions the vehicle runs basically in a rather shaky and unruly fashion.

DESCRIPTION OF THE INVENTION

It is an object of the present invention to improve vehicles of the type to which the invention pertains particularly rail vehicles and to obtain more stable running conditions in curves and elsewhere.

In accordance with the preferred embodiment of the present invention it is suggested to provide front and rear wheels on one side of the vehicle such that they are mounted to the vehicle frame individually through bogies which are pivotable about vertical axes. The wheels on the other side are just pivotable on vertical axes, but are not mounted on pivotable bogies. The bogies are preferably oriented towards the front and the back, and, as they are mounted to the frame in this fashion, actually compensate on straight track portions by and, in themselves, any deviations in distance between the rails and, therefore, render unnecessary the twin wheel bogies which were deemed necessary in the past for negotiating curves. Specifically the invention is characterized by the fact that the equipment has altogether only six vertical axes with four wheels which in many instances is sufficient for the load conditions and replace swivel mount as well as additional bogies.

DESCRIPTION OF THE DRAWINGS

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings, in which:

FIG. 1 is a side view of a vehicle running on rails; and constructed to include an example of the preferred embodiment of the invention to practice the best mode thereof;

FIG. 2 is a front view of the vehicle and rail structure shown in FIG. 1;

FIG. 3 is a top elevation of the vehicle shown in FIGS. 1 and 2;

FIG. 4 illustrates schematically the pivot motion of a bogie during negotiating a curve, the bogie being inwardly oriented;

FIG. 5 illustrates the frame of another vehicle in side elevation, differing from FIG. 1 in some details including particularly the wheels;

FIG. 6 is a top elevation of the frame shown in FIG. 5;

FIG. 7 is a bogie used in the vehicle shown in FIG. 5 but being shown in side elevation on an enlarged scale; and FIG. 8 is a top elevation of the bogie shown in FIGS. 6 and 7.

Proceeding now to the detailed description of the drawings, the figures show two rails 1 and 1a of a catanry system i.e. the rails are suspended and are arranged at equidistant spacing. Vehicles, in turn, are suspended from the rails. Such a vehicle includes a carrier frame, made of longitudinal bars or sections 7 and 7′, and cross or transverse bars 10. A pantograph-like lifting, hoisting, and lowering device 11 is suspended from that frame and pivotable gripping arms 17 extend from the device 11. The pantograph is driven by a motor 21.

The vehicle includes four wheel mounts 4, respectively, for wheels 3, two of which are driven by motors 2. The wheel mounts 4 for the motor driven wheels (motors 2) are directly mounted to the longitudinal frame bar 7 being, as seen in direction of travel, on the right-hand side of the vehicle. The motors 2 and motor 21 are controlled by a controller 20. All these wheel mounts 4 are balanced and positioned under utilization of guide rollers 5 for running laterally along the rails. In the specific case of FIGS. 1, 2, and 3 the wheel mounts 4, which are mounted on a frame carrier bar 7 being on the right hand side as seen in the direction of movement, are mounted on vertical wheel mount axles 6. The wheel mounts 4 on the other side have their vertical axles 6 mounted on bogies 8. These bogies 8, in turn, are pivotally linked through vertical shafts 9 on the frame carrier 7.

The bogies 8 are actually swivel arms for outwardly or inward swinging, though inward swinging is not essential. The essential function of the bogies is to compensate for different rail spacings. Rails are, of course, generally equidistantly spaced, but that equidistance dimension is a radial one in curves while the vehicle itself does not adapt to the curve. Hence, in terms of parallel wheel axes, the effective rail spacing in a curve increases.

The pivotable bogies as per FIGS. 5-8 are mounted on the right hand side of the carrier frame. In all instances, the respective front bogie is oriented to point in the direction of motion from the respective pivot while the rear bogie is analogously oriented to point towards the rear.

FIG. 4 illustrates in two different (schematic) examples that not only can the pivotal bogies be arranged on the right or left hand side but they may point in opposite directions, i.e. towards each other. The frame is, in simplified fashion shown to be provided with a central longitudinal carrier 7a with cross bars 10a at its end and the front and rear bogies 8 may be oriented towards the inside as seen from any transverse bar 10a.

The solid drawn vehicle has the left-hand wheels mounted on pivot bogies, the dotted line vehicle has the right-hand wheels mounted on pivot bogies. The arrow denotes the direction of travel.

In the case of all these bogies it only matters that during curves and for equidistant and constant (radial) rail spacing d the requisite larger wheel distance d' is now being compensated. This compensation is always required if the vehicle as in the present case is not provided with the very expensive double wheel bogie.

FIGS. 7 and 8 illustrates details of mounting the bogies 8 to frame bars generally, for example, those shown in FIGS. 5 and 6. The bogies are pivoted on axles 9 traversing in bores 13a of mounting plates 13. These plates 13 are fastened by means of bolts 14 to the carrier bar 7 (or 7'). Cylindrical roller bearings 15 are provided for journalling shafts 9 in the plate 13, for supporting the shafts 9 in a low friction manner. The wheel mount axles 6 traverses bores 8b of the bogie 8 and are, respectively, welded thereto. A lower guide ring 4a of the wheel mount 4 reaches under a collar 16 of a sleeve 17 that are fastened together by means of a pin 18 to the wheel mount shaft 6. Cylindrical roller bearings 19 are provided above and below the sleeve 17 for rotatably mounting the wheel mount 4.

The invention is not limited to the embodiments described above, but all changes and modifications thereof, not constituting departures from the spirit and scope of the invention, are intended to be included.

I claim:

1. Rail vehicle having a frame for supporting and mounting of wheels which run on parallel rails further comprising:

means for pivoting mounting front and rear wheels with horizontal axes on one side of the vehicle independent from mounting of wheels on the other side of the vehicle;

the front and rear wheels on said other side of the vehicle also having horizontal axes and running on one particular rail, said other side wheels being separately mounted on bogies; and said bogies being individually pivotably mounted on said frame for pivoting on vertical axes, said wheels on said one side of the vehicle not pivoting on vertical axes.

2. Rail vehicle as in claim 1 wherein the bogie for mounting the one front wheel being directed and oriented towards the direction of vehicle propagation.

3. The vehicle as in claim 1 wherein said bogie for mounting said rear wheel is directed and oriented in a direction opposite the direction of propagation of said vehicle.

4. Rail vehicle including a frame further comprising front and rear wheel mounts for respectively mounting for rotation a pair of rear wheels and a pair of front wheels, all said wheels having horizontal axes;

a bogie mounted to said rear wheel mount for mounting one of the rear wheels for pivoting about a vertical axis, the other one of the rear wheels being mounted independently from said bogie on said rear wheel mount and not pivoting on a vertical axis; and another bogie for mounting one of the front wheels to said front wheel mount for pivoting about a vertical axis, the other one of the front wheels being independently mounted to said front wheel mount and not pivoting on a vertical axis.

5. Rail vehicle as in claim 4, said bogies, respectively, mounting said one rear wheel and said one front wheel on the same side for said wheels to run on the same rail.

6. Rail vehicle as in claim 4 including guide rollers on said wheel mounts for laterally engaging rails.

7. Rail vehicle as in claim 4 wherein said frame includes a longitudinal carrier bar having ends, there being mounting plates mounted on the ends of upper and lower side of said carrier bar and projecting from the respective ends, the mounting plates being provided with bores for receiving shafts, said shafts provided for pivoting said bogies.

8. Rail vehicle as in claim 4 each of the bogies being pivotally mounted by means of a shaft, a respective free end of the bogy carrying another vertical shaft within an axially undisplaceable sleeve having a collar, a guide ring of the wheel mount gripping under said collar.

* * * * *